United States Patent [19]
Jones

[11] 3,860,347
[45] Jan. 14, 1975

[54] CUVETTE CONSTRUCTION

[75] Inventor: Alan Richardson Jones, Miami, Fla.

[73] Assignee: Coulter Electronics, Inc., Hialeah, Fla.

[22] Filed: Aug. 6, 1973

[21] Appl. No.: 386,028

[52] U.S. Cl. ............................... 356/246, 250/576
[51] Int. Cl. .............................................. G01n 1/14
[58] Field of Search ....... 73/425.6, 425.4 P; 356/70, 356/180, 181, 244, 246; 250/576

[56] References Cited
UNITED STATES PATENTS

| | | | |
|---|---|---|---|
| 2,756,597 | 7/1956 | Koblanski | 73/425.6 |
| 2,930,238 | 3/1960 | Kellett | 73/425.4 P |
| 3,263,554 | 8/1966 | Pickels | 356/246 |
| 3,572,952 | 3/1971 | Anthon | 356/246 |

Primary Examiner—Ronald J. Stern
Assistant Examiner—F. L. Evans
Attorney, Agent, or Firm—Silverman & Cass, Ltd.

[57] ABSTRACT

A cuvette having a tubular body, an upper head portion and a lower substantially conically shaped portion having a central port defining an entrance. An examining chamber is defined within said cuvette body. The interior walls of said body are characterized by the absence of sharp angular junctions so that there are smooth transitions between adjacent planes within the chamber. A ball preferably of glass is seated at the entrance upon at least a pair of inwardly directed upset portions so that the ball is prevented from tightly seating in the cuvette entrance. The combination of the ball and upset portions provides an impedance to outflowing liquids from the chamber through the lower port. The head portion of the cuvette comprises an end cap or plug sealedly engaged removably within the upper end of the body and having a through passage terminating in a port directed to the body interior radially of the axis of said body. A probe secured to the lower end of the cuvette body at the entrance completes the cuvette assembly.

9 Claims, 2 Drawing Figures

PATENTED JAN 14 1975

3,860,347

3,860,347

1
CUVETTE CONSTRUCTION

CROSS-REFERENCE TO RELATED APPLICATIONS

Reference is made to applications Ser. Nos. 189,312 now U.S. Pat. No. 3,781,116 issued Dec. 25, 1973, 351,793 and 385,837 filed Oct. 14, 1971, Apr. 16, 1973 and Aug. 6, 1973 respectively, for descriptions of photometric and/or colorimetric systems utilizing a cuvette coupled to a probe and operable by application of air and vacuum alternatively to fill and flush the cuvette. All these applications are owned by the assignee hereof or related companies thereto.

BACKGROUND OF THE INVENTION

The technique of making chemical tests leading to colorimetric or spectrophotometric measurement of the resulting reactions is well known. The normal procedure is to mix the chemicals in a reaction tube and, after a given time of incubation at some predetermined temperature, pour a small quantity into a cuvette which is placed in the path of a beam of light of some specific wavelength. The reaction may be performed directly in the cuvette in some cases. The light passing through the cuvette is intercepted by a photoresponsive device whose electric current output is related to the amount of light which has been affected by the mixture. Commonly the reaction is selected to be one which will cause a change in color with time to indicate some change in one of the chemical reactants. The cuvette provides the container adapted to be placed in intercepting relation to the beam of light and within which the reaction and/or the result of the reaction is photometrically monitored.

The practice of this technique requires considerable skill and there are many different types of apparatus used to practice such method. Such analytical techniques require the assurance that the reagents have been thoroughly mixed prior to the colorimetric or spectrophotometric reading is taken, and that the mixtures are well guarded against contamination from other reactants or determinations.

Great interest has been exhibited in the automatic performance of chemical tests of this type using a plurality of different tests to be performed on an almost production line basis. Both in medical and industrial research, plural tests from plural sources are required and such tests have become tedious, time consuming, expensive and difficult. The so-called automatic chemistry apparatus has been offered to the art in solution to the many problems encountered in the manual methods.

The invention herein is especially intended for use with an automatic chemistry apparatus which handles a large number of different samples on a continuing testing basis. The reactions are carried on in reaction tubes, they must be mixed, withdrawn from the tubes into a cuvette for measurement, measured colorimetrically or photometrically while in the cuvette, discharged from the cuvette and the cuvette rendered clean so that the next test can be conducted with a minimum of contamination. All of these steps must be done automatically, unattended, and with reliability.

In some previously available structures for the purpose concerned the volumes of liquids were transported by selected application of vacuum and pressure upon means within the cuvette chamber to draw the sample liquid into the cuvette chamber from a source. Problems arise attributable to the means within the chamber such as response time to change of condition, contamination, incomplete discharge and others present in varying degree although the structure still remains of considerable advantage. Another expedient has been to effect the introduction and discharge of liquids from the cuvette by using an outside pump operable to introduce and to discharge selectively liquids into the cuvette chamber but without any interior disposed means. Here, when such sample is drawn, say by way of a probe structure in communication with the body interior, the liquid is drawn directly or straight through axially into the cuvette chamber. The liquid flow is characterized generally by a laminar flow introduced therein which causes the liquid to splash against the top of the cuvette chamber, changing the pressure and sample flow characteristics into the cuvette. Bubbles thus were introduced into the sample and further, cleaning of the cuvette was rendered difficult since it was hard to remove liquid material that had splashed about the top of the cuvette.

Accordingly, it would be of considerable value to avoid such interior splashing when liquid is caused to flow into the cuvette chamber by way of a pump or the like coupled thereto.

SUMMARY OF THE INVENTION

A cuvette construction comprising a tubular body having at least a pair of opposite parallel planar transparent walls, an upper head including a port and a lower head having a central port. The lower central port is coupled to a depending hollow probe. There is a free spherical body loosely seated over the substantially conically tapered entrance. Means are provided at the entrance of the chamber loosely to seat the spherical body thereby permitting fluid flow from the chamber upon application of pressure by way of the cylinder. Said means may take the form of at least a pair of inwardly directed protrusions to define a path to enable fluid to be forced therepast. Means are provided to alternatively apply vacuum and pressure to the interior of the cuvette chamber at the upper head. Upon application of pressure, liquid interior of said chamber is forced past the ball or spherical body to and through the probe. Upon application of vacuum thereafter, liquid is caused to flow into the probe to engage the spherical body to displace same from its seated condition preventing splashing and destroying the formation of laminar flow into the chamber.

DESCRIPTION OF PREFERRED EMBODIMENTS

Figure 1:
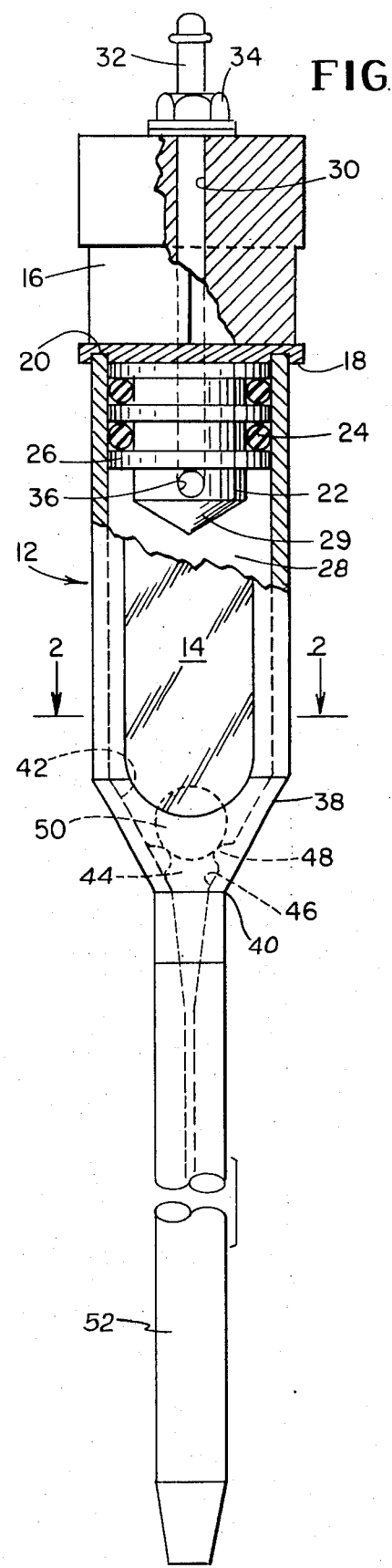
FIG. 1 is a side view of the cuvette constructed in accordance with the invention, portions being shown in broken section to illustrate interior detail.
Figure 2:
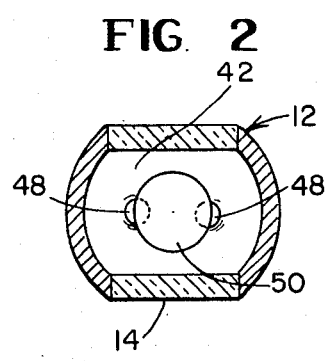
FIG. 2 is a section taken along line 2—2 of FIG. 1 and in the direction of the arrows.

The cuvette 10 constructed in accordance with the invention herein is illustrated in FIG. 1 and comprises a hollow glass tubular body 12 suitable for arrangement with its axis vertical in suitable holder means (not shown). The glass tubular member 12 includes at least a pair of opposite planar parallel transparent windows 14. The tubular body 12 has an upper head 16 telescopically engaged therewithin. The head 16 has flange 18 which rests on the rim 20 of the body 12. The upper head 16 has a reduced diameter portion 22 which is disposed within the body 12. The reduced diameter portion 22 has a pair of elastomeric O-rings 24 seated thereupon and spaced one from the other by flat retaining rings 26. The face 29 of the reduced diameter portion 22 is conical to reduce possible splashing, if any and faces inward of the chamber 28 defined within the body 12.

The upper head 16 has an axial passageway 30 over which a hose fitting, nipple 32, is coupled by fastening means 34. The passageway 30 terminates just short of portion 28 in a right angle bend opening toward the circumferential wall of portion 22 in radially opening port 36. The nipple 32 is adapted to be connected to a source alternatively of vacuum and air pressure with suitable valving not shown. When installed within a system of automatic chemical analysis, the operation of the cuvette may be controlled by programming means which operate a control valve.

The lower end of body 12 is tapered conically to a reduced diameter portion 40. The floor 42 of the chamber 28 is gently sloped to a central port or entrance 44. Narrowing tapered passage 46 leads to said port 44. Inwardly directed upsets or protrusions 48 are provided on the wall defining floor 42 spaced about said entrance or port 44. A spherical body 50 such as a glass ball, is seated upon said upsets 48 so that there is a somewhat loose seating of the ball 50 at the port 44. This permits flushing of the chamber, such as by application of air pressure to cause a flow past the ball 50.

The seating of ball 50 at the port 44 causes fluid first to engage the spherical wall thereof from whence it is directed to the walls of the chamber 28 in a sweep motion. The tendency of the entering fluid to develop laminar flow on entry to chamber 28 is destroyed substantially reducing the chance of contamination and the heretofore encountered splashing of said entering fluid against the head 16.

A glass probe 52 is coupled sealably to reduced diameter portion 40. As stated above, the upper head 16 is sealably engaged with body 12 by the O-rings in assembly thereon. The port 36 directed radially also reduces the likelihood of splasing and/or contamination. Purpose of providing a removable rather than a permanent seal of the head 16 to body 12 is to facilitate cleaning of the cuvette. The upper head also provides a convenient location upon which to grip the assembly 10 in installing same, say in a colorimeter or the like.

The use of parallel planar transparent surfaces as windows for the light beam permits the use of an optical system which is less critical of lateral cuvette positioning in the beam than a rounded or cylindrical configuration. The windows also cause the optical transmission of the empty cuvette to be more nearly equal to its transmission when filled with a relatively non-absorbing liquid.

In operation, the probe 52 is introduced into a liquid. Vacuum is applied to the interior of body 12 drawing liquid from a source (not shown) through the probe into the cuvette chamber 28 to fill same to a predetermined volume. The fluid entering the chamber 28 first engages the spherical body 50 and travels along the spherical surface thereof to the walls of the cuvette chamber 28. The formation of laminar flow up the center of the cuvette is prevented by the presence of the ball 50. The small raised upsets 48 prevent the sealed seating engagement of the ball in the entrance 44. When the photometric measurement has been completed, and say, air pressure is introduced into the chamber 28, the liquid can flow freely past the ball 50 even when it is seated on the upsets 48 at the entrance 44. The introduction of pressure to the filled cuvette chamber 28 aids to clean the walls thereof as the liquid is expelled. Splashing materially is reduced due to the spherical configuration of the ball member 50. Passage 46 may have an enlarged portion opening to the entrance 44 so as to facilitate movement of the liquid. The probe 52 can be cleaned by the administration of the air pressure by way of port 36, as mentioned.

Obviously details may be varied without departing from the spirit or scope of the invention as defined in the appended claims.

What is desired to be secured by Letters Patent of the United States is:

1. A cuvette for use in photometric examination of liquid samples comprising: a hollow body having upper and lower ends, a head removably sealingly engaged within the upper end of said body and having a through passageway, one end thereof opening radially to the interior of the body, the other end of said passageway being adapted to be connected to a source of pressure and to a source of vacuum alternatively, the lower end of said body having a central port defining an entrance, a generally spherical member seated at said entrance and capable of free movement within said body, detent means inwardly disposed of said entrance to maintain a loose engagement between said ball and body at said entrance whereby to effect turbulent flow of liquid entering the hollow body therepast which is directed to the interior walls of the hollow body obviating laminar flow along the axis of the body.

2. The cuvette as claimed in claim 1 and a depending hollow probe coupled to said entrance.

3. The cuvette as claimed in claim 1 in which said body includes at least a pair of opposite flat parallel transparent walls capable of having a beam of radiation passed therethrough.

4. The cuvette as claimed in claim 1 in which an examining chamber is defined within said hollow body, said chamber including a pair of opposite flat parallel transparent walls defining a window and an arcuate floor gradually sloped toward said entrance, and said detent means comprise inwardly directed upsets formed in said floor about said entrance.

5. The cuvette as claimed in claim 4 in which said upsets are arranged symmetrically about said entrance.

6. The cuvette as claimed in claim 2 in which an examining chamber is defined within said hollow body, said chamber including a pair of opposte flat parallel transparent walls defining a window and an arcuate floor gradually sloped toward said entrance, and said detent means comprise inwardly directed upsets formed in said floor about said entrance.

7. The cuvette as claimed in claim 6 in which said upsets are arranged symmetrically about said entrance.

8. For use in a photometric analysis system, a cuvette which includes a lower open end defining an entrance adapted for communication to a source of liquid, a volume displacement device operatively arranged relative to said cuvette, a fluid connection for operating said volume displacement device to cause liquid to be drawn into and discharged therefrom; the improvement comprising: turbulence generating means provided at said entrance whereby to direct flow of liquid entering said cuvette toward the interior wall thereof eliminating formation of laminar flow within said cuvette, said turbulence generating means comprising a freely movable spherical body loosely seated within said cuvette at the entrance and detent means formed in said cuvette at said entrance, said detent means being inwardly directed of the entrance, and said spherical body being seated upon said detent means, said spherical body capable of being displaced when liquid is drawn into the cuvette through said entrance the said liquid first impinges upon the surface of said spherical body when entering said cuvette thereby to be diverted to the interior wall of the cuvette.

9. The structure as claimed in claim 8 in which said detent means comprise integral upsets formed in the interior wall of said cuvette at the entrance and extending radially inward thereof.

* * * * *